United States Patent [19]

Moggi et al.

[11] Patent Number: 5,219,927
[45] Date of Patent: Jun. 15, 1993

[54] PROCESS FOR PROTECTING AND CONSOLIDATING LAPIDEOUS MATERIALS

[75] Inventors: Giovanni Moggi; Desiderata Ingoglia, both of Milan, Italy

[73] Assignee: Ausimont S.p.A., Milan, Italy

[21] Appl. No.: 814,108

[22] Filed: Dec. 26, 1991

[30] Foreign Application Priority Data

Jan. 3, 1991 [IT] Italy .............................. 00005 A/91

[51] Int. Cl.$^5$ ...................... C08F 36/00; C08G 63/91
[52] U.S. Cl. .................................. 525/54.3; 525/55; 525/57; 525/59; 525/60; 428/421
[58] Field of Search ................. 428/421; 525/54.3, 55, 525/57, 59, 60

[56] References Cited

U.S. PATENT DOCUMENTS 4,764,431  8/1988  Placenti et al. .................... 428/421

FOREIGN PATENT DOCUMENTS 0058393  8/1982  European Pat. Off. .
0159268 10/1985  European Pat. Off. .
0192494  8/1986  European Pat. Off. .
0374804  6/1990  European Pat. Off. .
2060522  6/1971  Fed. Rep. of Germany .

OTHER PUBLICATIONS

English translation of claims of German Patent Application No. 2 060 522.
Communication from the European Patent Office dated Apr. 24, 1992, attached to European Search Report.

*Primary Examiner*—John Kight, III
*Assistant Examiner*—Duc Truong
*Attorney, Agent, or Firm*—Elizabeth M. Barnhard

[57] ABSTRACT

The surface of lapideous materials, marble, sandstone, tiles, cement conglomerates and articles and structures manufactured therefrom are consolidated and protected against atmospherical and polluting agents by superficially applicating a mix composed of:

a) a vinylidene fluoride elastomeric copolymer comprising 55–85% by mols of vinylidene fluoride, 15–45% by mols of hexafluoropropene and 0–30% by mols of tetrafluoroethylene;

b) polytetrafluoroethylene or a copolymer of tetrafluoroethylene containing up to 12% by mols of other perfluorinated monomers.

6 Claims, No Drawings

PROCESS FOR PROTECTING AND CONSOLIDATING LAPIDEOUS MATERIALS

The present invention relates to a process for consolidating and protecting lapideous materials, marble, sandstone, tiles and cement conglomerates as well as articles manufactured therefrom, which are exposed to the degrading action exerted by atmospheric agents and pollutants.

As is known, the degrading of the construction materials (marble, sandstones, tiles, etc.) and of the decorative and artistic articles manufactured starting from said materials is caused by a plurality of phenomena both of physical and chemical nature, which mainly occur in the presence of water. In order to efficaciously exert its function, a consolidating/protective agent shall sensibly reduce, in the first place, the inlet and the penetration rate of water inside the material to be protected. On the other hand it is necessary to avoid that the protective layer, when exerting such action, may simultaneously give rise to degrading side-phenomena or at any rate to undesired secondary effects. The essential characteristics of a good consolidating/protective agent can be summarized as follows:

1. Capability of restoring the cohesion between the particles of the surface layer of the degraded material and the underlaying undamaged part.
2. Exhibiting an adequate mechanical resistance of the surface layer so consolidated.
3. Maintaining elastic characteristics in the consolidated surface layer in order to prevent the formation of a rigid surface layer having mechanical characteristics different from the ones of the substrate.
4. Chemical inertia towards the material to be protected and consolidated.
5. Low volatility.
6. Stability to the action of atmospheric agents, to sunlight and to heat.
7. Not altering the material chromaticity.
8. Retaining in the time the own solubility characteristics in order to secure the reversibility of the treatment.
9. Maintaining a sufficient permeability of the treated surface to air and to water vapor in order to avoid alteration phenomena under the impermeable film due to the action of the condensate in the inside of the materials.

It is known to use perfluoropolyethers as protective agents for the lapideous and cement articles, according to what is disclosed in U.S. Pat. Nos. 4,499,146 and 4,745,009. Such products, although they solve the problem of the protection, are not capable, however, to exert an effective consolidating action owing to their liquid nature. A substantial improvement was obtained by the use of polymers based on vinylidene fluoride, which efficaciously exert both a protective and a consolidating function. As is described in U.S. Pat. No. 4,764,431, such result is obtained by applying onto the material to be protected and consolidated a solution, in volatile solvents, of a polymer based on vinylidene fluoride, optionally copolymerized with hexafluoropropylene and/or tetrafluoroethylene.

A further development is represented by the process described in EP-374803, where a mix is utilized, which is composed of a vinylidene fluoride homopolymer or copolymer, in the form of a water dispersion, and of a perfluoropolyether water emulsion or microemulsion.

The Applicant has now surprisingly found that the application of a mix of a vinylidene fluoride copolymer and of a tetrafluoroethylene homopolymer or copolymer offers higher performances than the ones obtainable by the use of a vinylidene fluoride copolymer alone. In particular, both the protective effectiveness and the consolidating power are improved, obtaining, at the same time, a reduction of the friction coefficient and an improvement of the mechanical properties of the protective/consolidating layer.

Thus, an object of the present invention is a process for consolidating and protecting lapideous materials, marbles, sandstone, tiles, cement conglomerations and structures and articles manufactured from such materials, against the degrading action exerted by the atmospheric agents and polluting agents, present in the atmosphere, which process consists in using, as a protective and consolidating agent, a mix consisting of:

a) an elastomeric copolymer of vinylidene fluoride (VDF) comprising 55–85% by mols of VDF, 15–45% by mols of hexafluoropropylene (HFP) and 0–30% by weight of tetrafluoroethylene (TFE);
b) polytetrafluoroethylene (PTFE) or a TFE copolymer containing up to 12% by mols of other perfluorinated monomers.

The mix can be prepared either by mixing the two components in the form of a water dispersion, or by dissolving the fluoroelastomer in an organic solvent and by dispersing in such solution the PTFE in the form of a fine powder.

In both cases, the total concentration, calculated on dry basis, of the polymeric mix generally ranges from 1 to 40% weight by volume (grams per 100 ml of solvent or of water), preferably from 2 to 10% weight by volume.

The weight ratio on dry basis between fluoroelastomer and PTFE generally ranges from 40:1 to 1:1, preferably from 10:1 to 3:1.

The elastomeric copolymers of VDF are broadly known in the art as they are described, for example, in Kirk-Othmer, "Encyclopedia of Chemical Technology", vol. 11, page 64 (Ed. 1980) and in "Polymer", 27, 906 (1986). Such copolymers are non-vulcanized fluoroelastomers, available on the market under several trade designations (TECNOFLON, VITON, FLUOREL, DAIEL).

The fluoroelastomer water dispersion can be directly prepared by polymerization as is described in Kirk Othmer or in "Polymer" (loc. cit.), optionally operating in the presence of a surfactant. The latex can be stabilized, in turn, by stabilizers of polymeric latexes such as e.g. TRITON×100 ®.

As TFE copolymers suitable for being used in the present invention there are to be cited, for example, the ones containing up to 10% by mols of hexafluoropropylene or up to 5% by mols of perfluoroalkyl-perfluorovinyl ethers, in particular perfluoropropyl-perfluorovinyl ether used in amounts up to 3% by mols.

The average molecular weight of the TFE homopolymer or copolymer generally ranges from 100,000 to 2,000,000.

Besides the PTFE directly prepared in a water dispersion by emulsion polymerization, it is possible to use a PTFE powder having a particle size up to 16 microns, prepared by treating the polymer particles, deriving from the dispersion polymerization, by jet-mill and then re-dispersion in water by means of a non-ionic surfactant such as Triton×100 and with the addition of ammonium perfluoro-octanoate.

As already mentioned herein, the mix to be applied onto the material to be protected and consolidated can be prepared simply by mixing the fluoroelastomer and the TFE homopolymer or copolymer in the form of a water dispersion.

As an alternative, the mix can be prepared by dissolving the fluoroelastomer in a proper organic solvent and by dispersing in such solution the TFE homopolymer or copolymer in the form of a fine powder.

The organic medium exerts, in this way, both a dissolving and a dispersing action. To this purpose there are generally utilizable the solvents described in U.S. Pat. No. 4,764,431, such as esters (for example methylene acetate or ethyl acetate), ketones (for example methyl ethyl ketone, acetone), ethers (for example tetrahydrofuran, methyl tert. butyl ether, methylisobutyl ether), optionally in admixture with a chlorofluorocarbon. In particular it is possible to use the azeotropic mix consisting of acetone (12.5% by weight and 1,1,2-trichlorotrifluoroethane (87.5% by weight), commercially known as Delifrene AC® and produced by Montefluos.

The PTFE in the form of a fine powder exhibits an average size of the primary particles generally ranging from 0.05 to 0.5 microns and it is preparable, for example, according to the method described in U.S. Pat. No. 4,902,538.

The process according to the present invention offers the applied amount of fluorinated polymers being equal-higher performances as compared with the methods of the prior art, in which the fluoroelastomer is used alone (as in U.S. Pat. No. 4,764,431) or in admixture with a perfluoropolyether (as in EP-374803), as regards both the protective effectiveness and the consolidating power.

Furthermore, the present invention provides protective coatings characterized by a lower friction coefficient value as compared with the fluoroelastomer alone. A low friction coefficient favours the flowing of water and of the pollutants contained therein and therefore reduces the absorption thereof by the treated surface.

An improvement is also obtained with respect to the fluoroelastomer alone, of the mechanical properties of the protective/consolidating layer, which is evidenced by an increase in the tensile strength.

The possibility of having available a protective and consolidating agent applicable both in water dispersion and through an organic medium represents a further advantage with respect to the mixes described in EP 374803, which are utilizable exclusively in a water dispersion. In fact, the mixes of the present invention can be applicated in the form of a water dispersion when it is desired to avoid using organic solvents, or through an organic medium when a quicker drying of the treated surface is required.

In both cases, the mix is applied onto the material to be protected and consolidated by means of any usual techniques such as, for example, brush, compressed-air spray gun, spray or immersion.

The protective and consolidating agent amount that is applied per surface unit is a function of the physical characteristics of the surface, such as e.g. the porosity and the disaggregation state; the higher the porosity and the disaggregation state of the material, the higher shall be the protective/consolidating agent amount to be applied. Indicatively, the total applied amount of fluorinated polymers ranges from 3 g/m$^2$ for the aggregation and the protection of low-porosity materials, to 100 g/m$^2$ for high-porosity materials. More usually, such amount ranges from 5 to 50 g/m$^2$.

The following examples are given for illustrative purposes and are not to be considered as a limitation of the scope of the present invention.

UTILIZED PRODUCTS

DISP. 1: water dispersion of VDF/TFE/HFP terpolymer (molar ratio: 65/15/20), prepared by polymerization in the presence of ammonium persulphate according to what is described in Kirk-Othmer (loc. cit.) and stabilized with 2% by weight of TRITON ×100 ®. The dispersion contains 30% by weight of terpolymer.

DISP. 2: water dispersion of PTFE stabilized with 3% by wg. of TRITON ×100 ® and marketed as Algoflon D 60 ®. The dispersion contains about 55% by weight of PTFE.

MIX 1: a mix of dispersion 1 and of dispersion 2, such that the terpolymer/PTFE weight ratio is 9:1.

MIX 2: like mix 1, but with a terpolymer/PTFE ratio equal to 4:1.

MIX 3: a mix consisting of dispersion 1 and of a perfluoropolyether microemulsion, in which the terpolymer/perfluoropolyether weight ratio is 21/100 (it corresponds to mix 1 of EP 374803).

MIX 4: like Mix 3 in which the terpolymer/perfluoropolyether weight ratio is 233/100 (it corresponds to mix 4 of EP 374803).

The mixes are diluted with demineralized water before being used, up to a total polymer concentration of about 3% by weight.

TESTS

Protective efficiency (P.E.)

It is determined by the method described in U.S. Pat. Nos. 4,499,146 and in 4,764,431, which consists in measuring the amount of water absorbed per material surface unit by means of a graduated micropipette connected with a cylinder containing water and applicated to a face of the test piece.

The P.E. % is calculated as follows:

$$P.E. \% = \frac{Z - Y}{Z} \times 100$$

where Z and Y indicate the water amount absorbed per cm$^2$ by the untreated test piece and by the treated test piece, respectively.

Aggregative efficiency (A.E.)

It is determined by the method described in U.S. Pat. No. 4,764,431, which consists in measuring the weight loss of the test pieces after abrasive treatment.

The A.E. % is calculated as follows:

$$A.E. \% = \frac{P - Q}{P} \times 100$$

where P and Q indicate the weight loss per surface unit of the untreated test piece and of the treated test piece, respectively.

UTILIZED MATERIALS

| | |
|---|---|
| Pietra di Vicenza: (Vicenza stone) | biocalcarenite with a porosity equal to about 30%; |
| Mattone di Siena: (Siena brick) | it has a porosity equal to about 40%; |
| Pietra di Lecce: (Lecce stone) | calcareous rock belonging to the group of the biocalcarenites, having a porosity equal to about 35%. |

EXAMPLES 1-6 (Table I)

There were used six test pieces (5×5×5 cm) of Pietra di Vicenza, one of which (Ex. 1) was not protected, while the others were coated, by means of a brush, with the products indicated in Table I.

For each test piece, the P.E. % was determined as specified hereinbefore. The data are reported in Table I.

From a comparison between Ex. 2 and Ex. 3 and between Ex. 5 and Ex. 6 it is apparent that the presence of PTFE in the terpolymer dispersion sensibly raises the protection level with respect to the terpolymer alone, the total amount of applicated fluorinated polymers being equal.

From a comparison of Ex. 2 with Ex. 4 it is furthermore inferable that the mix of terpolymer and PTFE has a higher protective efficiency than the mix of terpolymer and perfluoropolyether.

EXAMPLES 7-9 (Table II)

There were used three test pieces of Mattone di Siena, one of which was not treated, while the others were coated with the products indicated in Table II.

The P.E. % was determined. From a comparison between Ex. 8 and Ex. 9 it is evident that the presence of PTFE in the mix remarkably raises the protective efficiency, the total amount of applicated fluorinated polymers being equal.

EXAMPLES 10-14 (Table III)

There were utilized five test pieces (5×5×5 cm) of Pietra di Lecce, artificially aged with 300 cycles, as is described in EP 374803.

One of the test pieces was left as such, while the remaining test pieces were treated with the products indicated in Table III.

The aggregative efficiency (A.E.%) was determined as specified hereinbefore.

From a comparison of Ex. 11 and 12 with Ex. 13 it is apparent that the aggregative efficiency of the mixes of terpolymer and PTFE is remarkably higher than the one of the terpolymer alone.

Furthermore, a comparison between Ex. 11 and 12 and Ex. 14 proves that such mixes are more effective as aggregating agent also than the mixes of terpolymer and perfluoropolyether.

EXAMPLES 15-17 (Table IV)

In a solution of Tecnoflon NH ® (copolymer produced by Montefluos, consisting for 79% by mols of VDF and for 21% by mols of HFP, $\overline{M}n = 1.5 \cdot 10^5$ approx.) in Delifrene AC ®, there was dispersed PTFE in the form of a fine powder, as is described in U.S. Pat. No. 4,902,538, in such amounts as to obtain the Tecnoflon/PTFE ratios indicated in Table IV.

By evaporation of the solvent it was possible to obtain films having a thickness of about 0.2 mm.

Following the same modalities, a check film was prepared, which consisted of Tecnoflon NH ® alone and had a thickness of about 0.2 mm.

On the test pieces so obtained there were measured the friction coefficient according to method ASTM D 1894 (steel check plate) and the tensile strength according to method ASTM D 412. From a comparison of the obtained data with one another (Table IV) it is apparent that the PTFE addition causes a considerable decrease in the friction coefficient and a higher tensile strength.

TABLE I

| Example | treated material | protective and aggregating agents | total amount of applicated product (g/m$^2$) | amount of applicated PTFE (g/m$^2$) | amount of applicated terpolymer (g/m$^2$) | amount of absorbed water (g/cm$^2$) | P.E. (%) |
|---|---|---|---|---|---|---|---|
| 1 | PIETRA | — | — | — | — | 1.260 | — |
| 2 | DI | MIX 1 | 30 | 3 | 27 | 0.441 | 65 |
| 3 | VICENZA | DISP. 1 | 30 | — | 30 | 0.643 | 49 |
| 4 | | MIX 3 | 30 | 24.8 (PFPE) | 5.2 | 0.529 | 58 |
| 5 | PIETRA | MIX 2 | 50 | 10 | 40 | 0.378 | 70 |
| 6 | DI VICENZA | DISP. 1 | 50 | — | 50 | 0.479 | 62 |

TABLE II

| Example | treated material | protective and aggregating agents | total total amount of applicated product (g/m$^2$) | amount of applicated PTFE (g/m$^2$) | amount of applicated terpolymer (g/m$^2$) | amount of absorbed water (g/cm$^2$) | P.E. (%) |
|---|---|---|---|---|---|---|---|
| 7 | MATTONE | — | — | — | — | 2.41 | — |
| 8 | DI | DISP 1 | 30 | — | 30 | 1.18 | 51 |
| 9 | SIENA | MIX 1 | 30 | 3 | 27 | 0.72 | 70 |

TABLE III

| Example | treated material | protective and aggregating agents | total amount of applicated product (g/m²) | amount of applicated PTFE (g/m²) | amount of applicated terpolymer (g/m²) | weight loss per surface unit (g/m²) | A.E. (%) |
| --- | --- | --- | --- | --- | --- | --- | --- |
| 10 | PIETRA | — | — | — | — | 105 | — |
| 11 | DI | MIX 1 | 50 | 5 | 45 | 43 | 59 |
| 12 | LECCE | MIX 2 | 50 | 15 | 35 | 29 | 72 |
| 13 |  | DISP. 1 | 50 | — | 50 | 64 | 39 |
| 14 |  | MIX 4 | 50 | 15 (PFPE) | 35 | 59 | 44 |

TABLE IV

| Example | Tecnoflon NH (% by wg. on dry basis) | PTFE (% by wg. on dry basis) | Friction coefficient | | Tensile strength (MPa) | |
| --- | --- | --- | --- | --- | --- | --- |
|  |  |  | at starting | in movement | Stress 100% | Stress max |
| 15 | 100 | — | >5 | >5 | 1.0 | 1.14 |
| 16 | 90 | 10 | 3.2 | 2.7 | 1.14 | 1.18 |
| 17 | 70 | 30 | 1.7 | 1.7 | 2.82 | 2.95 |

We claim:

1. A process for consolidating and protecting lapideous materials, marble, sandstone, tiles, cement conglomerates and articles and structures manufactured from such materials against the degrading action exerted by atmospheric agents and pollutants, comprising the step of applying the surface of the material to be consolidated and protected a mix composed of:
   a) an elastomeric vinylidene fluoride copolymer comprising 55-85% moles of vinylidene fluoride, 15-45% moles of hexafluoropropylene and 0-30% moles of tetrafluoroethylene;
   b) polytetrafluoroethylene or a tetrafluoroethylene copolymer containing up to 12% moles of other perfluorinated monomers.

2. The process of claim 1, wherein components (a) and (b) are mixed in the form of a water dispersion prior to application of the mix to the surface of the material.

3. The process of claim 1, wherein component (a) is dissolved in an organic solvent and component (b) is dispersed in the resulting solution in the form of a fine powder prior to the application of the mix to the surface of the material.

4. The process of claim 1, wherein the weight ratio on dry basis between component (a) and component (b) ranges from 40:1 to 1:1.

5. The process of claim 4, wherein said weight ratio ranges from 10:1 to 3:1.

6. Lapideous materials, marble, sandstone, tiles and cement conglomerates consolidated and protected against the degrading action exerted by atmospheric agents and pollutants through the process described in claim 1.

* * * * *